United States Patent
Kranzley et al.

(10) Patent No.: US 7,801,825 B2
(45) Date of Patent: Sep. 21, 2010

(54) SYSTEMS AND METHODS FOR CONDUCTING SECURE PAYMENT TRANSACTIONS USING A FORMATTED DATA STRUCTURE

(75) Inventors: Arthur D. Kranzley, Pound Ridge, NY (US); Stephen W. Orfei, Katonah, NY (US); Bruce J. Rutherford, Stamford, CT (US); Mark Wiseman, Chesterfield, MO (US)

(73) Assignee: Mastercard International Incorporated, Purchase, NY (US)

( * ) Notice: Subject to any disclaimer, the term of this patent is extended or adjusted under 35 U.S.C. 154(b) by 720 days.

(21) Appl. No.: 10/560,177

(22) PCT Filed: Jun. 10, 2004

(86) PCT No.: PCT/US2004/018658

§ 371 (c)(1),
(2), (4) Date: Jan. 29, 2007

(87) PCT Pub. No.: WO2005/001635

PCT Pub. Date: Jan. 6, 2005

(65) Prior Publication Data

US 2007/0143227 A1    Jun. 21, 2007

Related U.S. Application Data

(60) Provisional application No. 60/477,187, filed on Jun. 10, 2003.

(30) Foreign Application Priority Data

Jun. 4, 2004    (WO) ............... PCT/US2004/017756

(51) Int. Cl.
*G06Q 20/00*    (2006.01)

(52) U.S. Cl. .............. 705/67; 705/39; 705/51; 705/59; 705/76; 705/79; 380/21; 380/24; 715/512; 715/539

(58) Field of Classification Search ............. 705/51–79, 705/39; 380/21, 24; 715/512, 539
See application file for complete search history.

(56) References Cited

U.S. PATENT DOCUMENTS 5,809,144 A * 9/1998 Sirbu et al. .................... 705/53

(Continued)

FOREIGN PATENT DOCUMENTS

| EP | 1 014 317 | 6/2000 |
| WO | WO 02/079911 | 10/2002 |

*Primary Examiner*—Pierre Eddy Elisca
*Assistant Examiner*—Shahid Kamal
(74) *Attorney, Agent, or Firm*—Baker Botts LLP (57) ABSTRACT

A formatted data structure is provided for conveying the results of ecommerce authentication programs that are used to authenticate a cardholder's on-line transactions. The data structure, which has at most a 20-byte length, is designed to be compatible with 3-D Secure message protocols used in e-commerce. The data structure includes designated fields that include a hash of the merchant's name, identify an authentication service provider, identify the authentication method used, and include a merchant authentication code which ties cardholder information to the transaction. Secure payment algorithms are provided for use by the e-commerce authentication programs to generate authentication results in the desired format. In one secure payment algorithm, a secret key is used to encrypt a concatenation of a cardholder account number with information from designated fields of the data structure. In another secure payment algorithm, a pair of secret keys is used to encrypt a concatenation of the cardholder's account number, card expiration date and service code. In both cases, portions of the encryption results are used to define the merchant authentication code.

19 Claims, 3 Drawing Sheets

U.S. PATENT DOCUMENTS

| | | |
|---|---|---|
| 6,029,150 A * | 2/2000 | Kravitz .................. 705/39 |
| 6,038,551 A | 3/2000 | Barlow et al. |
| 6,105,013 A * | 8/2000 | Curry et al. ............... 705/65 |
| 6,138,107 A * | 10/2000 | Elgamal .................. 705/39 |
| 6,529,885 B1 * | 3/2003 | Johnson .................. 705/64 |
| 6,915,279 B2 * | 7/2005 | Hogan et al. ............. 705/64 |
| 7,120,802 B2 * | 10/2006 | Shear et al. .............. 713/194 |
| 7,127,606 B2 * | 10/2006 | Wheeler et al. .......... 713/156 |
| 7,133,845 B1 * | 11/2006 | Ginter et al. ............. 705/51 |
| 7,200,749 B2 * | 4/2007 | Wheeler et al. .......... 713/170 |
| 7,249,097 B2 * | 7/2007 | Hutchison et al. ........ 705/39 |
| 7,349,871 B2 * | 3/2008 | Labrou et al. ............. 705/26 |
| 7,404,148 B2 * | 7/2008 | Lincke et al. ............. 715/805 |
| 2001/0032154 A1 | 10/2001 | Schummer |
| 2002/0194138 A1 | 12/2002 | Dominguez et al. |
| 2003/0200184 A1 * | 10/2003 | Dominguez et al. ....... 705/78 |
| 2003/0212642 A1 | 11/2003 | Weller et al. |
| 2005/0004978 A1 * | 1/2005 | Reed et al. ............... 709/203 |
| 2007/0088950 A1 * | 4/2007 | Wheeler et al. .......... 713/170 |

\* cited by examiner

SYSTEMS AND METHODS FOR CONDUCTING SECURE PAYMENT TRANSACTIONS USING A FORMATTED DATA STRUCTURE

CROSS-REFERENCE TO PRIORITY AND RELATED APPLICATIONS

This application is a national phase of International Application Serial No. PCT/US04/018658, filed Jun. 10, 2004, published Jan. 6, 2005, which claims the benefit of U.S. provisional patent application Ser. No. 60/477,187, filed Jun. 10, 2003, each of which are incorporated by reference in their entireties herein, and from which priority is claimed. This application is further related to International patent application No. PCT/US04/017756, filed Jun. 4, 2004, entitled "Customer Authentication in E-Commerce Transactions," as well as to U.S. patent application Ser. No. 10/096,271, filed Mar. 11, 2002, now U.S. Pat. No. 6,915,279, entitled "System and Method for conducting Secure Payment Transactions," each of which are incorporated by reference in their entireties herein, and from which priority is claimed.

BACKGROUND OF INVENTION

The present invention relates to systems and methods for authenticating transactions conducted by parties over open electronic networks such as the Internet. In particular, the invention relates to authentication of Internet transactions in which customers charge payments to payment cards, including credit cards.

E-commerce is now popular. Conducting transactions over electronic networks such as the Internet has the now oft-stated advantages of convenience, lower costs, market reach and choice, for both merchants and customers. However, the anonymity of the Internet brings to a commercial or retail sale the issues of fraud and misuse. A transacting merchant has a desire to authenticate the sale, certify the sale, confirm the sale, ensure non-repudiation of the sale, ensure payment, and control anonymity. Similarly, a buyer has a desire to control authentication of the sale, integrity of the sale, recourse of a bad sale, confirmation of the sale, privacy, and anonymity.

Commonly assigned U.S. patent application Ser. No. 10/096,271 filed Mar. 11, 2002, which is hereby incorporated by reference in its entirety herein, describes a system and method for conducting secure payment transactions utilizing user software at a customer terminal to receive a set of Web page data to be used for displaying a Web page, which may include one or more hidden fields. The Web page with transaction and cardholder data is sent to the merchant as the purchase data. The merchant may submit this web page data electronically, for example, to an issuer, for authentication or authorization of the payment transaction.

Card issuers and other financial institutions now offer or use standardized Internet transaction protocols to improve on-line transaction performance and to accelerate the growth of electronic commerce. Under some standardized protocols (e.g., 3-D Secure™ Protocol developed by Visa International) card issuers or issuing banks may authenticate transactions thereby reducing the likelihood of fraud and associated chargebacks attributed to cardholder not-authorized transactions. The presence of an authenticated transaction may result in an issuer assuming liability for fraud should it occur despite efforts to authenticate the cardholder during an online purchase. Card issuers or issuing banks may assure merchants that they will be paid for issuer-authenticated transactions. The 3-D Secure™ protocol is consistent with and underlies the authentication programs offered by card issuers (e.g., Verified by Visa or MasterCard SecureCode™) to authenticate customers for merchants during remote transactions such as those associated with the Internet. The 3-D Secure™ Protocol leverages existing Secure Sockets layer (SSL) encryption functionality and provides enhanced security through issuer authentication of the cardholder during the online shopping session. A piece of software called the Merchant Plug In (MPI) is used by participating merchants to exchange messages, pass information and query participants in order to establish an authentication session between the cardholder and their card issuer during an online purchase.

The 3-D Secure Protocol services are based on a three-domain model—the issuer domain, the acquirer and the interoperability domain. The issuer is responsible for managing the enrollment of cardholders in the service, and for authenticating cardholders during on-line transactions. The acquirer is responsible for defining procedures so that merchants participating in Internet transactions operate under an agreement with the acquirer, and for providing back end processing for authenticated transactions. The interoperability domain facilitates the transaction exchange between the other two domains with a common protocol and shared services. Cardholders and their banks may come under "issuer domain", merchants and their banks may come under the "acquirer domain". Communication between issuing and acquiring banks or financial institutions and card issuer infrastructure may come under "Interoperability Domain". While transacting with 3-D Secure compliant banks and merchants, a consumer may have the same Internet shopping experience as previously, except that there is a separate authentication window or pop-up screen from the cardholder's bank to determine if the transacting party is indeed the cardholder of record. The transaction flow for an on-line Internet purchase transaction under the protocol may be as follows:

(1) Customers fill in payment data at Merchant web sites in the usual fashion, via an encrypted Secure Sockets Layer (SSL) connection.

(2) The Merchant then sends a message through an MPI to a Directory, which in turn queries the card issuer, to find out whether the customer is enrolled in the 3-D Secure program.

(3) The card issuer responds to the Directory with a message indicating whether the cardholder is enrolled and, if so, provides a Web address for the bank that issued the card. This message is then processed and a response forwarded to the Merchant.

(4) The Merchant then sends a message to the issuing bank, through the cardholder device, to initiate and authentication session between the cardholder and the card issuer in which transaction details such as Merchant name and transaction amount may also be presented to the cardholder for confirmation.

(5) The issuing bank will then populate an authentication window to the cardholder detailing information related to the transaction such as merchant name and amount, a personal security message, and a response area where authentication details can be entered by the cardholder.

(6) The customer approves the transaction in one of a variety of ways, depending on how the issuing bank chooses to implement the system. Options may range from entering a static password or PIN to utilizing a smart card and a Personal Card Reader (PCR) to generate an authentication token.

(7) The issuer may process the transaction and cardholder data for authentication. If the authentication is valid, the issuer sends a message to the merchant indicating the authentication was successful. The issuer also notifies the merchant if the authentication failed or was unable to be completed. The message may include an Accountholder Authorization Value (AAV) encoding the authentication process results.

Consideration is now being given to ways of enhancing the systems and methods for authenticating customers, who use credit or debit cards for payment in electronic transactions. Attention is directed to the data and the algorithms that are used to securely authenticate the customer or card for payment to the merchant. The solutions should preferably be compatible with industry implementations of common protocols like 3-D Secure and other industry standards such as the EMV standard for smart cards.

SUMMARY OF THE INVENTION

In accordance with the present invention, authentication programs that are consistent with 3-D Secure protocols are provided for authenticating on-line cardholder transactions. The authentication programs use an access control server (ACS) to authenticate cardholder transactions. Secure Payment Algorithms (SPA) are applied by the ACS to cardholder and transaction information to generate an encrypted Accountholder Authentication Value (AAV), which is assigned to an authenticated transaction. The generated AAV has a data structure that is suitable for inclusion in 3-D Secure protocol messages.

In preferred embodiments of the invention, the data structure has a length of no more than about 20 bytes of Base 64 encoded characters. The first byte may be a control byte, bytes 2-9 may represent a hash of a merchant name, and byte 10 identifies the particular ACS that authenticated the cardholder transaction. Various authentication methods (e.g., password based, chip based, or PC identification methods) may be used by the ACS to authenticate the cardholder transaction. Byte 11 of the AAV data structure identifies the authentication method and the secret encryption keys that are used by the ACS to generate a Merchant Authentication Code (MAC). Bytes 12-15 of the AAV data structure identifies a sequence number of transactions processed by the ACS, and bytes 16-20 represent the MAC.

SPA may include suitable encryption processes to generate MAC values for a particular transaction. One encryption process uses a secret key to encrypt a concatenation of the card holder's account number and fields 1-6 (or bytes 1-15) of the AAV. The first 40 bits (or 5 binary bytes) of the encryption result are assigned to the MAC field. In another encryption process, a pair of Data Encryption Standard (DES) keys is used to encrypt a concatenation of the card holder's account number, card expiration date and service code to generate a three-digit Cardholder Verification Code (CVC2) number This three digit number is converted into binary coded decimal which then is used to populate one and one half bytes of the MAC field in the AAV data structure. The remaining three and one half bytes of the MAC field may be padded or populated with binary zeros.

3-D Secure Protocol electronic messages, which include AAV data, may be digitally signed by the Access control server (ACS). The merchant receiving a message containing the AAV data may be required to validate the digital signature in conformity with the 3-D Secure Protocol before extracting or using the AAV data. Merchants may transfer the AAV data and in particular MAC data to payment authorization request messages.

Further features of the invention, its nature, and various advantages will be more apparent from the following detailed description and the accompanying drawings

BRIEF DESCRIPTION OF THE DRAWINGS

Throughout the figures, unless otherwise stated, the same reference numerals and characters are used to denote like features, elements, components, or portions of the illustrated embodiments.

DETAILED DESCRIPTION OF THE INVENTION

The present invention provides solutions for authenticating remote parties in an electronic transaction. In particular, the solutions relate to Secure Payment Applications (e.g., FIG. 1 SPA 135) that are used to authenticate a cardholder who remotely participates in the electronic transaction. The solutions may be used for transaction authentication on industry standard e-commerce platforms, such as 3-D Secure compliant e-commerce platforms, and in non e-commerce environments such as mail order and telephone order or mobile devices where an authentication token or code can be used by the issuer to authenticate the cardholder.

TABLE 1 is a glossary of several of the terms, acronyms or abbreviations that are used in the description herein.

TABLE 1

| | |
|---|---|
| AAV | Accountholder Authentication Value |
| Access control server (ACS) | The Access control server services to validate the enrollment of a specific, cardholder account number (PAN) in 3-D Secure, as well as authenticate transactions. |
| Accountholder Authentication Value (AAV) | Cardholder authentication data required for electronic commerce transactions in which cardholder authentication has been successfully performed. |
| Cardholder Authentication Verification Value (CAVA) | Cardholder authentication data required by Visa for electronic commerce transactions in which cardholder authentication has been successfully performed. |

TABLE 1-continued

| | |
|---|---|
| Card Verification Code (CPC) | A two-part card security feature. CVC 1 is a 3-digit value encoded on tracks 1 and 2 in three contiguous positions in the "discretionary data" field of a magnetic stripe on a card. CVC 2 differs from CVC 1 and is indent-printed into the tamper-evident signature panel on the card. The CVC is intended to inhibit the alteration or misuse of card data and enhance the authentication of the card. |
| Message Authentication Code (MAC) | Cryptographically generated code that is a function of the message contents and a secret key shared by the message originator and the message recipient. This value, generated by the originator and verified by the recipient, enables the recipient to detect any alteration to the original message. |
| Secure Payment Application (SPA) | Specifications and algorithm for generating cardholder authentication data from merchant and issuer data components resulting in the creation of an AAV. |
| Universal Cardholder Authentication Field (UCAF) | The universal multi-purpose data transport infrastructure and defined field that is used to communicate and transport authentication information, including AAV, among various stakeholders in a transaction. |

Figure 1:
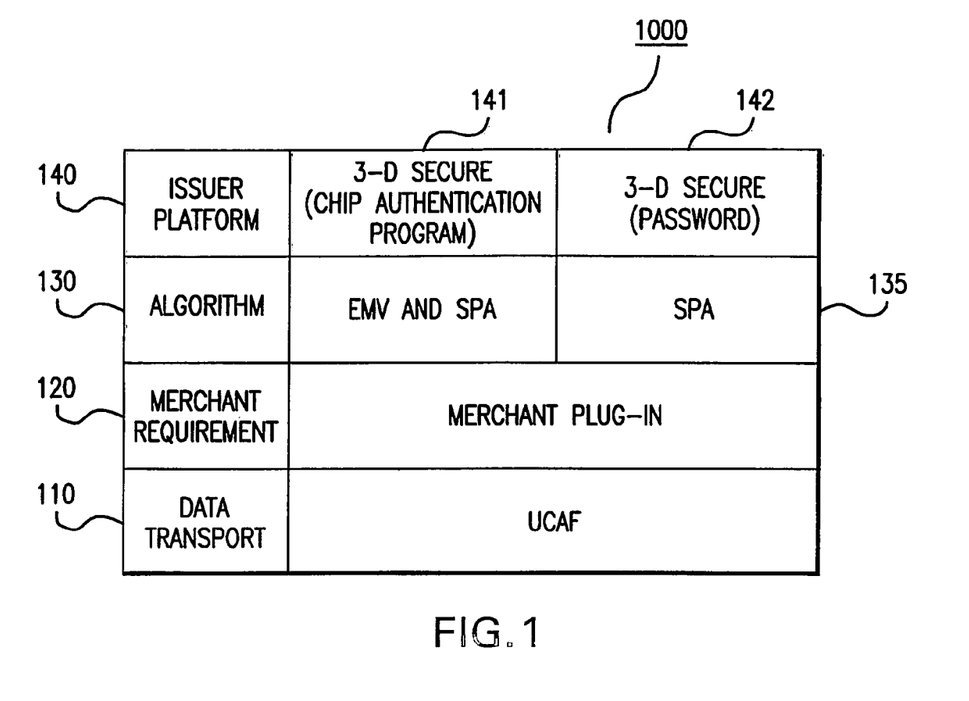
FIG. 1 is a schematic illustration of an exemplary authentication program utilizing Secure Payment Algorithms (SPA) to generate Accountholder Authentication Values (AAV) for payment transactions, in accordance with the principles of the present invention.

SPA 135 may include cryptography algorithms (namely "HMAC" and "CVC2" algorithms) that are used to generate Cardholder Authorization Verification Values (CAVV) in formats that are compatible with 3-d Secure message formats.

SPA 135 may be integrated with any suitable authentication program that card issuers may choose or implement for authenticating their cardholders. The authentication programs may include smart card-based and password based solutions (e.g., FIG. 1 chip based authentication program 141 and 3-D Secure password-based authentication program 142). The authentication programs also may include other solutions based, for example, on PC identification.

An authentication program in which the inventive Secure Payment Applications (SPA 135) are utilized may be a solution or program for securing electronic transactions conducted on e-commerce platforms that are compliant with the 3-D Secure protocols. For this purpose SPA 135 is designed to use and generate authentication results in data format that can e readily used in 3-D Secure messages. In particular, a formatted data structure with defined fields and byte length may be used to facilitate transportation of authentication results in 3-D Secure messages.

For purposes of illustrating the application of SPA 135 in an exemplary authentication program 1000 (FIG. 1), a card payment transaction is used herein as an exemplary transaction. The participants in the card payment transaction may include a cardholder, an issuer, a merchant and an acquirer.

A cardholder is an authorized user of a payment card issued, for example, by a licensed member of authentication program 1000. The cardholder may use the issued payment card to pay for an on-line transaction with a merchant. Authentication program 1000 may be part of an authentication program or services provided by a third party (e.g., MasterCard) who, for example, can ensure that the cardholder's identity and presence is properly authenticated prior to the completion of the transaction.

An issuer is a member (e.g., a financial institution) that issues the payment card, which may be branded (e.g., MasterCard® and/or Maestro® cards). The issuer guarantees payment for an authorized transaction using the payment card in accordance with payment card brand regulations and local legislation. The issuer may be responsible for determining cardholder eligibility to participate in authentication program 1000, in addition to providing authentication services to merchants or other parties.

A merchant is a retailer, or any other person, firm, or corporation who, for example, pursuant to a merchant subscription agreement, agrees to accept issuers' payment cards for payment when they are properly presented. By subscribing to authentication program 1000, a merchant can offer a cardholder an authenticated electronic interaction over the Internet. A merchant who accepts payment cards may have a further relationship with an acquirer. Merchants who participate in authentication program 1000 may benefit in several ways including reduced fraud and dispute costs, increased transaction volume, protection from unauthorized card use, and access to the issuer's card base.

An acquirer is an entity who maintains relationships with merchants and acquires the data relating to a transaction from the merchant or card acceptor. The acquirer may be responsible for determining the merchant eligibility to participate in authentication program 1000.

As shown in FIG. 1, exemplary authentication program 1000, may be implemented as a secure e-commerce arrangement or platform with a number of layered components. The layered components include data transport layer 100, merchant requirement layer 120, authentication layer 130, and issuer platform 140. Authentication layer 130 relates to the Secure Payment Applications (SPA 135) that are deployed to authenticate a transaction or payment.

Data transport layer 100 relates to data collection and transport infrastructure that is used to communicate authentication information and results amongst the cardholder, issuer, merchant and acquirer. The data transport may, for example, based on standardized data structures, architectures or mechanisms such as the Universal Cardholder Authentication Field (UCAF).

Figure 2:
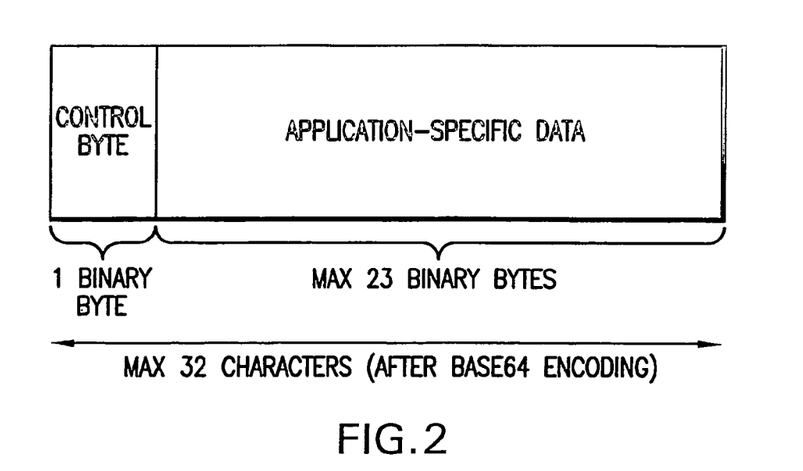
FIG. 2 is a schematic illustration of the structure of a Universal Cardholder Account Field, which is used for transporting the output of the Secure Payment Algorithms (SPA) of FIG. 1, in accordance with the principles of the present invention.

UCAF may in general be defined as a variable length, 32-character field with a flexible data structure that can be tailored to support the needs of a variety of issuer security and authentication approaches. FIG. 2 shows a generic structure of UCAF. A first control byte in UCAF contains a value that is specific to each security payment application or aspect. The remainder of the bytes in UCAP may include application specific data. An authentication or authorization provider may be responsible for assigning and managing UCAF control byte values and the structure of UCAF application specific data.

An exemplary control byte definition may be as follows:

| Usage | 3-D Secure SPA AAV for first and subsequent transactions |
|---|---|
| Base 64 Encoded Value | j |
| Hexadecimal Value | x'8C' |

Another exemplary control byte definition may be as follows:

| Usage | 3-D Secure SPA AAV for attempts |
|---|---|
| Base64 Encoded Value | j |
| Hexadecimal Value | x'86' |

In conventional UCAF implementations, the application specific data may be defined as binary data with a maximum length of 24 binary bytes—including the control byte. However, some transaction authorization networks limit the passing of binary data in authorization messages. Accordingly, all UCAF data generated by SPA 135 in authentication program 1000 may be Base 64 encoded prior to inclusion in an authorization message. The Base 64 encoding produces a character representation of the associated binary data. The resulting character representation is approximately a third larger than the binary equivalent. For this reason, the UCAF field may in general be defined with a maximum length of 32 characters. However for compatibility with 3-D Secure messaging in authentication program 1000, the UCAF field is limited to 28 characters in length.

The Accountholder Authentication Value (AAV) is a specific implementation of UCAF related to issuer authentication platforms that incorporate the SPA. AAV may be generated by the issuer and presented to the merchant for placement in a transaction authorization request (to the acquirer) upon successful authentication of the cardholder by the issuer. In the case of a chargeback or other potential dispute processing, AAV may be used to identify the processing parameters associated with the transaction. UCAF is the mechanism that is used to transmit the AAV from the merchant to issuer for authentication purposes during the authorization process.

With renewed reference to FIG. 1, merchant requirement layer 110 relates to merchant capabilities for interacting with the other layers and the cardholder. Merchants participating in authentication program 1000 may implement application software capabilities (e.g., merchant plug-ins (MPI)) that are capable of processing 3-D Secure messages. A MPI may serve as the controlling application for the processing of 3-D Secure messages.

Authentication layer 130, which includes the inventive SPA 135, represents the authentication process or services (e.g., provided by or contracted for by an issuer) for verifying cardholder account ownership. An issuer using, for example, an access control server (ACS) may implement authentication layer 130/SPA135 in conjunction with an AAV validation server/process.

Exemplary e-commerce network components or entities that are involved in the authentication process may for purposes illustration be organized as belonging to issuer, acquirer or interoperability domains as shown in TABLE 2.

TABLE 2

| Issuer Domain | Interoperability Domain | Acquirer Domain |
|---|---|---|
| Cardholder Browser Related Cardholder Software | Directory Server Certificate Authority | Merchant Plug-In Signature Validation Server |
| Enrollment Server Access Control Server AAV Validation Server/Process | | |

With reference to TABLE 2, the functionality present in the issuer domain includes a cardholder browser which can act as a conduit for transporting messages between the MPI (in the acquirer domain) and the access control server (in the issuer domain). Related cardholder software, for example, may include optional software to support use of smart cards. The enrollment server facilitates the process of cardholder enrollment for an issuer's implementation of 3-D Secure under authentication program 1000. The server may be used to perform initial cardholder authentication, as well as for administrative activities such as resets and viewing 3-D Secure payment history.

The access control server provides at least two basic functions during the course of an online purchase. First, ACS will verify whether a given cardholder account number is enrolled in program 1000. Secondly, ACS will conduct authentication processes for cardholder identification. For this purpose, ACS may operate in conjunction with or include an AAV validation server/process. This AAV validation server/process also may be used to validate cardholder authentication data received from merchants or acquirers.

The functionality in the acquirer domain may include the functions of a Merchant Plug-in (MPI) and a signature validation server. The MPI may create and process payer authentication messages and then returns control to merchant software for further authorization processing. MPI authentication processes may be invoked after a cardholder submits a purchase request, including the account number to be used for payment, but prior to obtaining authorization for the purchase. The signature validation server may be used to validate a digital signature on a purchase request that has been successfully authenticated by the issuer.

The functionality in the interoperability domain may include a directory server. The directory server may be a global directory sever, which provides centralized decision making capabilities to merchants enrolled in the in authentication program 1000. Based on the account number contained in a merchant verification request message, the directory may first determine whether the account number is part of a participating card issuer's card range. It may then direct eligible requests to the appropriate issuer's ACS for further processing. The interoperability domain also may include a suitable certificate authority for generating and distribute all private hierarchy end-entity and subordinate certificates, as required, to the various components and to other subordinate certificate authorities across all three domains.

The cardholder authentication process in program 1000 involves exchanges of messages and data across the three domains. The following exemplary 3-D Secure inter domain messages may be used step-by-step in the authentication process:

(1) Verification Request/Response
Message Pair: VEReq/VERes

A first step in the authentication process is to check or validate that the cardholder account number is part of the card range of an issuer participating in authentication program 1000. For this purpose, a Verification Request message VEReq, is sent from the MPI to the directory to check card range eligibility. If the specified account number is contained within an eligible card range in the directory, this message then may be forwarded from the directory to the issuer's ACS to further check if the specified account number is enrolled and/or activated by the issuer as a participant in program 1000.

The MPI may have an optional capability to locally cache card ranges by each participating issuer. In such cases, Card Range Request/Response messages may be used by the MPI to request updates to the card range caches from the directory. For merchants who cache card ranges, the VEReq/VERes messages may not be utilized if the local cache indicates that the issuer is not enrolled in authentication program 1000.

(2) Payer Authentication Request/Response
Message Pair: PAReq/PARes

Once it has been determined that the cardholder is enrolled by an issuer or is an active participant in program 1000, the process of authenticating the specific cardholder further involves the specific card issuer. Payer Authentication Request/Response messages may be sent from the MPI to the specific card issuer's ACS to perform authentication. At this stage of the authentication process in program 1000, the cardholder may be presented with an authentication window. The authentication window may be displayed on the cardholder browser and be populated with relevant information by the issuer. The cardholder may be requested to enter a password, code or token for personal identification or authentication through the displayed authentication window. The specific card issuer's ACS may then use, for example, SPA 135 to authenticate the collected or entered information, and accordingly generate an Accountholder Authentication Value (AAV). The AAV is transported in the 3-D Secure PARes (Payer Authentication Response) message in a designated Cardholder Authentication Verification Value (CAVV) field in an UCAF.

Figure 4:
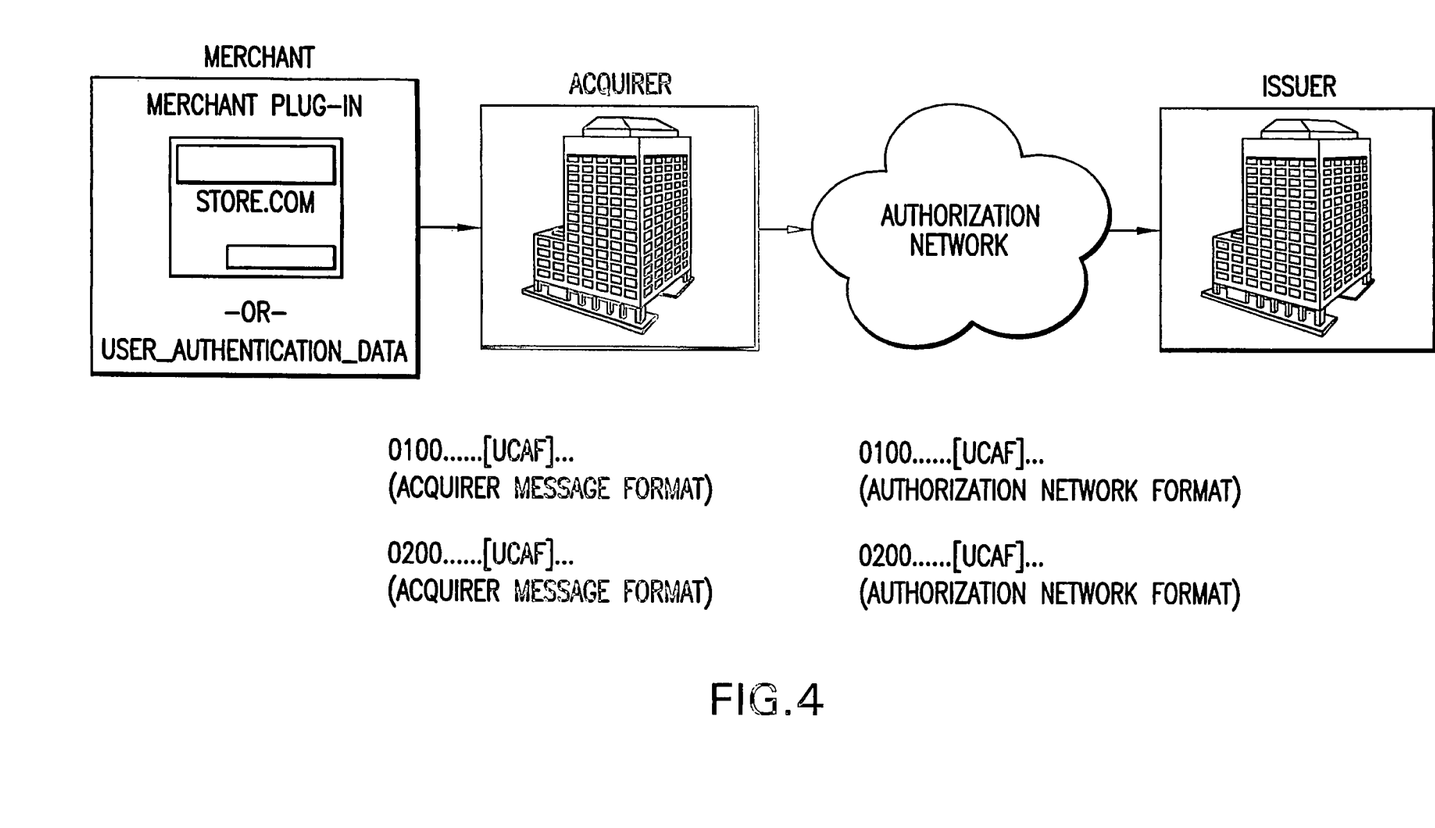
FIG. 4 is a schematic illustration of interaction between exemplary authentication and authorization entities involved in the authentication and authorization of on-line payment transactions.

CAAV is one of the data fields in the response portion of the message pair PAReq/PARes returned by the issuer to the requesting merchant. The issuer may place suitable digital signatures on their response. The merchant may, further, include the received AAV to an acquirer for forwarding to the issuer as part of a payment/transaction authorization request (See e.g., FIG. 4).

Figure 3:
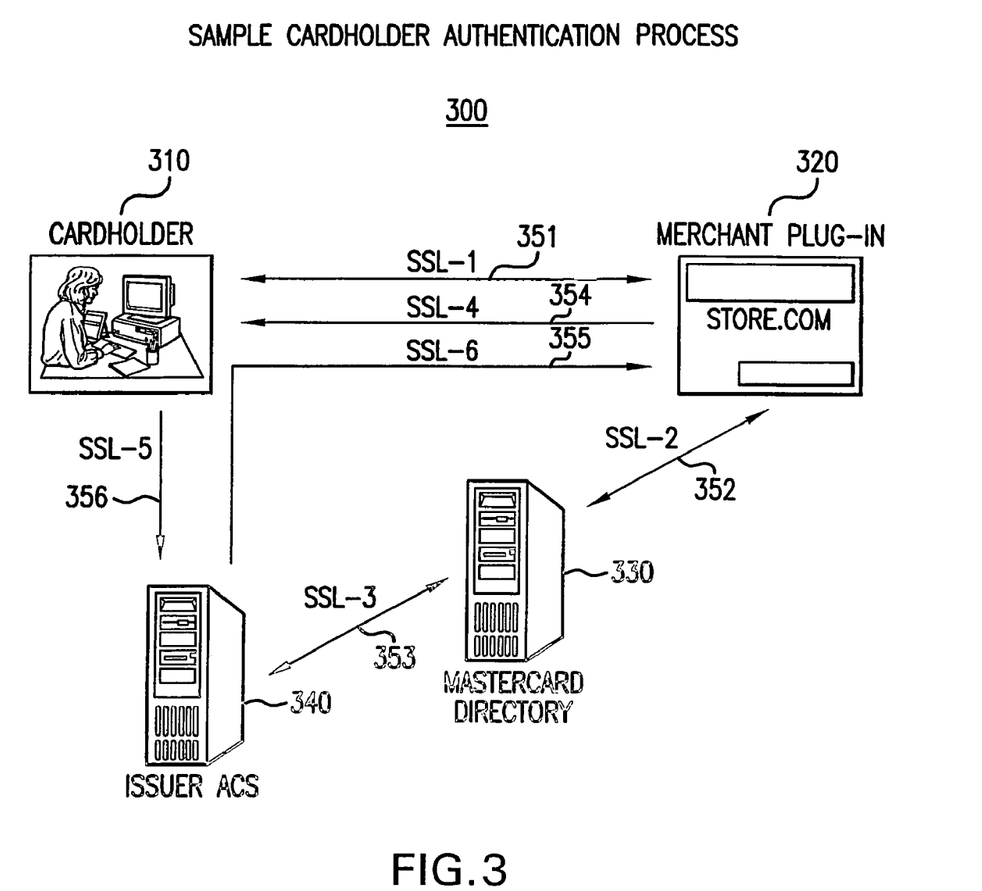
FIG. 3 is an illustration of some of the steps and message links between entities that are involved in an exemplary payment transaction authentication process, in accordance with the principles of the present invention.

FIG. 3 schematically shows an exemplary card authentication process 300 for a cardholder transaction under authentication program 1000. For purposes of illustration, the description of process 300 assumes that cardholder 310 is enrolled by an issuer in authentication program 1000 and has obtained a password or code from the issuer to use while shopping online at participating merchants. Process 300 also assumes that all communication channels between components (e.g., cardholder 310, MPI 320, directory 330 and issuer ACS 340) are properly secured using the Secure Socket Layer protocol (SSL) links (e.g., SSL-1, SSl-2, SSl-3, SSl-4, SSL-5 and SSL-6).

In process 300 at step 351, cardholder 310 may shop at a merchant web site and, when ready to checkout, enter payment card information (e.g., the account number) and other information (e.g., shipping information) via link SSL-1. Once all of the payment and shipping information has been entered, the merchant may give cardholder 310 an opportunity by to review the purchase before submitting an order.

Next at step 352, MPI 320 queries directory 330 via link SSL-2 to verify the enrollment of cardholder 310 with a specific issuer using the verification request message VEReq. Step 352 optionally may be performed locally at MPI 320 via a local card directory cache. In responses to the VEReq message, directory 330 may determine that a particular issuer is participating, and accordingly forward a request via link SSL-3 to the particular issuer's ACS 340 to check on the current enrollment status of cardholder 310. The resulting responses may flow back over the same links (e.g., SSL-3 and SSL-2) to MPI 320. If ACS 340 indicates that cardholder 310 is enrolled in program 1000, MPI 320 may create a Payer Authentication Request message and send it to the cardholder's browser at step 354 via link SSL-4. Next at step 355, the cardholder's browser may redirect the message to the appropriate issuer's ACS 340 to initiate cardholder authentication. When ACS 340 receives the Payer authentication request message, it may cause a user authentication dialog to begin. As part of the user authentication dialog, ACS 340 may cause a separate interactive authentication window to be displayed to cardholder 310 to facilitate password, code or other data input by cardholder 310.

At step 356, ACS 340 (using SPA 135) may authenticate the password or code entered by cardholder 310. ACS 340 may construct a SPA AAV according to the authentication program provider's implementation of 3-D Secure. ACS 340 may build and digitally sign an appropriate payer authentication response message. The payer authentication response message is then returned (via link SSL-6) to MPI 320. The authentication window displayed to cardholder 320 may disappear at this point.

After cardholder authentication process 300 has been completed, the merchant may be required to pass the received SPA AAV to the acquirer via the UCAF field within an authorization message. The SPA AAV may then passed along from the acquirer to the issuer as part of conventional authorization message processing. When received by the issuer, the AAV can be validated as part of authorization request processing, and archived for use in resolving any cardholder disputes that may arise later on.

Standard 3-D Secure version 1.0.2 message formats and data formats may be used for all data communications between the involved parties or entities. Specifically, the SPA AAV that ACS 340 creates and returns back to the merchant for inclusion in UCAF messages is 28 characters long and contains a 20-byte field defined for 3-D Secure in base 64 encoding.

TABLE 3 shows an exemplary data structure or format of a 20-byte SPA AAV.

TABLE 3

| Position | Field Name | Data Source: ACS | Length (Bytes) | Byte Number |
|---|---|---|---|---|
| 1 | Control Byte | The control byte is used to indicate the format and content of the associated AAV structure. A hexadecimal value x'8C' may indicate an AAV created as the result of a successful cardholder authentication. A | 1 | Byte 1 |

TABLE 3-continued

| Position | Field Name | Data Source: ACS | Length (Bytes) | Byte Number |
|---|---|---|---|---|
| | | hexadecimal value x'86' may indicate an AAV created as the result of attempts processing. | | |
| 2 | Hash of Merchant Name | The left most 8 bytes of an SHA-1 hash of the Merchant Name field from the PAReq. | 8 | Bytes 2-9 |
| 3 | ACS Identifier | This data field may allow an issuer to use up to 256 different ACS facilities. Values for this field may defined based on the algorithm used to create the MAC: 0-7 Reserved for HMAC 8-15 Reserved for CVC2 16-255 - Reserved for future use | 1 | Byte 10 |
| 4 | Authentication Method | Indicates how the cardholder was authenticated to the ACS: 0 = No Cardholder Authentication Performed (valid only for an AAV created using control byte value x'86' - Attempts processing.) 1 = Password 2 = Secret Key (e.g. Chip Card) | ½ (4 bits) | Byte 11, 1st hex digit |
| 5 | BIN Key Identifier | Indicates which one of the possible 16 issuer-known secret keys for a given BIN range was used by the ACS identified by the ACS identifier to create the MAC. | ½ (4 bits) | Byte 11, 2nd hex digit |
| 6 | Transaction Sequence Number | Unique number that can be used to identify the transaction within the ACS identified by the ACS identifier. Once the maximum value has been reached, the number should recycle back to 0. This number must be unique for every PARes created for a given ACS identifier for a given issuer during the time that a chargeback can occur. | 4 (8 hex digits) | Bytes 12-15 |
| 7 | MAC | Message Authentication Code, created by ACS. | 5 | Bytes 16-20 |

Issuers providing both existing PC identification or other authentication solutions (e.g., FIG. 1) in addition to a 3-D Secure solution may differentiate between the AAV values they receive from different authentication solutions in the corresponding authorization message. The 20-byte AAV (e.g., TABLE 2) resulting from 3-D Secure compatible program 1000 may differ from common 28-byte AAV structures (i.e., in non 3-D Secure programs) in the following ways: The transaction amount and currency codes are not included in the 20-byte AAV as this information is included in the signed PARes message; A merchant transaction stamp (MTS) is not included as a transaction identifier (XID), which is included in the signed PARes message, can provide the same functionality. Further, the hash of the merchant name field is expanded. As a result, only minimal edits of the merchant name may now be required prior to creating the SHA-1 hash.

A merchant may not have to modify the control byte for subsequent authorizations (e.g. split shipments). For split shipments, the merchant may resend an original AAV generated by 3-D Secure compliant implementations of program 1000.

The control byte value in the 20-byte SPA AAV is based on the result of the cardholder authentication request (PAReq). This result may be indicated in the transaction status field of the Payer Authentication Response (PARes) messages. TABLE 4 shows exemplary values of the transaction status field in a PARes message.

TABLE 4

| Transaction Status Field in PARes | Control Byte Value in AAV (hexadecimal) | First AAV Byte Value After Base64 Encoding | Authentication Method Field in AAV |
|---|---|---|---|
| Y | x'8C' | j | Any defined value other than "No Cardholder Authentication Performed" |
| A | x'86' | h | Must be "No Cardholder Authentication Performed" |
| N | No AAV is to be generated for this status value | — | — |
| U | No AAV is to be generated for this status value | — | — |

The merchant name contained in the PAReq message may be edited prior to creating the merchant name hash. The edits may specifically address Universal Transformation Format (UTF-8) encoding but also reference Unicode characters for other encoding types.

An edit may delete any UTF-8 byte sequence that does not have a Unicode representation. Such an edit may delete any UTF-8 bytes beginning with binary 1111 and all subsequent bytes beginning with binary 10

Another edit may delete any UTF-8 byte sequence or byte sequence with the following Unicode representation:

0000 through 001F (ASCI control characters;

007F through 00A0 (DEL and C1 control characters;

00AD (soft hyphen); and 2000 through 206F (General Punctuation).

Such an edit may delete the following UTF-8 bytes:

Hex 00 through 1F

Hex 7F

Hex C2 80 through C2 A0

Hex C2 AD

Hex E2 80 through E2 81 AF

Still another edit may delete any leading or trailing spaces (e.g., UTF-8 bytes Hex 20).

In the case of a chargeback or other potential dispute processing, the 20-byte AAV may be used to identify the processing parameters associated with the transaction. Among other things, the AAV field values may identify:

The physical location of where the transaction was processed.

The sequence number that can be used to positively identify the transaction within the universe of transactions for that location The secret key used to create the MAC, which not only ensures AAV data integrity but also binds the entire AAV structure to a specific PAN for implementations of 3-D Secure.

Field dependencies in the AAV may be established to ensure proper identification of the processing parameters. These field dependencies may be considered when building or configuring issuer ACS installations. For every ACS configured with the same ACS identifier:

The BIN Key Identifier field must be unique for each BIN range processed by the identified ACS. Most issuers may use a common set of keys for most or all of their BIN ranges. However, this configuration allows for flexibility in a choice of software vendors that support or issuers that require the use a separate set of keys.

The Transaction Sequence Number field must be unique for each AAV generated by the identified ACS within the time that a chargeback can occur.

ACS installations that have the capability to share BIN keys and a common set of transaction sequence numbers across multiple logical installations or physical machines may be advantageously configured to use the same ACS identifier. Alternatively, a separate ACS identifier or set of ACS identifiers may be required for each installation. In cases where one ACS facility serves multiple issuers, more than one issuer may share an ACS identifier. In these cases, the BIN field value for the associated transaction may become a determining factor in interpreting the field content location.

Particular algorithms may be utilized in SPA 135 to create a Merchant Authentication code (MAC) value. For example, an "HMAC" algorithm or an "CVC2" algorithm may be used by the ACS identified by the ACS identifier sub field to create MAC values.

The HMAC algorithm generates a MAC value cryptographically based on a secret key identified by the BIN Key Identifier sub field. This secret key is shared with the issuer and binds the cardholder account number to the AAV by the concatenation of the following data:

The account number, as received by the ACS in the Verification Request (VEReq) message that corresponds to the current Payer Authentication Request (PAReq) message. The account number may be represented as binary-coded decimal, left justified and padded on the right with hexadecimal 'F's to a length of 20 digits (10 total bytes).

The left-most 15 bytes, fields 1 through 6, of the AAV being constructed.

The secret key length may be optionally selected be a minimum of 128 bits (16 bytes) and a maximum of 192 bits (24 bytes). Any intervening key size (e.g. 160 bits) may be acceptable. The actual key length size used may be independently selected by each implementation. The MAC field within the SPA AAV defined for a 3-D secure authentication program (e.g., Program 1000) may be populated with the left-most 40 bits (5 binary bytes) of the cryptographic result obtained by applying algorithm HMAC.

EXAMPLES 1 and 2 illustrate the application of the HMAC algorithm using 20 byte and 16 byte keys, respectively, to generate SPA AAV values.

Example 1

20 Byte Key

Assumed account number: 5432 109876543210
Assumed Merchant Name: SPA Merchant, Inc. (All ASCII characters, and no editing required)
Assumed AAV control byte=8C
First 8 bytes, SHA-I hash of Merchant Name=7CA7 FBB6 058B 5114
Assumed ACS Id=01
Assumed Authentication Method=1 (Password)
Assumed BIN Key Id=I
Assumed Transaction Sequence Number=0000002F
Assumed key (20 Bytes)=OBOBOBOBOBOBOBOBOBO-BOBOBOBOBOBOBOBOBOB
Therefore SHA-1 HMAC is based on 5432 109876543210 FFFF 8C 7CA7FBB6058B5114 0111 0000002F
This produces a MAC whose first 5 bytes are:
3547 BA1E FF
Therefore, the complete AAV in hex is:
8C 7CA7FBB6058B5114 0111 0000002F 3547BA1EFF
after Base-64-encoding, this is:
jHyn+7YFiIEUAREAAAAvNUe6Hv8=

Example 2

16 Byte Key

Assumed account number: 5432 109876543210
Assumed Merchant Name: SPA Merchant, Inc. (All ASCII characters, and no editing required)
Assumed AA V control byte=8C
First 8 bytes, SHA-1 hash of Merchant Name=7CA7 FBB6 058B 5114
Assumed ACS Id=01
Assumed Authentication Method=1 (Password)
Assumed BIN Key Id=1
Assumed Transaction Sequence Number=0000002F
Assumed key (16 Bytes)=00112233445566778899AABBC-CDDEEFF
Therefore SHA-1 HMAC is based on 5432 109876543210 FFFF 8C 7CA7FBB6058B5114 0111 0000002F
This produces a MAC whose first 5 bytes are:
EB27 FC7F AB
Therefore the complete AAV in hex is:
8C 7CA7FBB6058B5114 0111 0000002F EB27FC7FAB
after Base-64-encoded, this is:
jHyn+7YFi1 EUAREAAAA v6yf8f6s=

The CVC2 algorithm also Cryptographically creates the MAC field values. In contrast to the HMAC algorithm, which uses one key, the CVC2 algorithm use two 64 bit DES keys identified by the BIN Key Identifier sub field. In the CVC2 algorithm, all encryption and decryption steps may use Electronic Code Book (ECB) form of DES.

The CVC2 algorithm generates a three digit 3 digit CVC2 value. The input data which is processed by CVC2 algorithm for generating this three digit 3 digit CVC2 value is shown in TABLE 5.

TABLE 5

| CVC2 Field Name | MAC Field Name | Data Source | Length (Digits) |
|---|---|---|---|
| Primary Account Number | Primary Account Number | The account number, as presented in the Verification Request (VEReq) message | 13 to 19 digits |
| Card Expiration Date | Transaction Sequence Number | Convert Transaction Sequence Number, as contained in AAV, to BCD decimal equivalent. Populate this field with the 4 least significant digits. Any value less than 4 digits should be right justified in the field and padded with binary zeros to 4 digits. | 4 digits |
| Service Code | Authentication Method | Authentication Method as contained in the AAV. If the value of the Authentication Method sub field is greater than 9, subtract 10 to obtain the digit to be used. | 1 digit |
|  | Control Byte | Convert Control Byte, as contained in the AAV, to BCD decimal equivalent. Populate this field with the 2 least significant digits. | 2 digits |

The resultant three digit CVC2 value is converted to binary coded decimal form and populated in the left most two bytes of the MAC sub field with a leading binary 0 used to fill the first unused half byte. The remaining three bytes of the MAC sub field may be filled with binary zeros. For example: CVC2=123 MAC sub field=0123000000 (10 total digits).

EXAMPLE 3 and TABLE 6 illustrate the application of the CVC2 algorithm and the process steps involved in application of the algorithm to generate SPA AAV values.

Example 3

Assumed account number: 5432109876543210
Assumed Merchant Name: SPA Merchant, Inc. (All ASCII characters, and no editing required)
Assumed AAV control byte=8C
First 8 bytes, SHA-1 hash of Merchant Name=7CA7 FBB6 058B 5114
Assumed ACS Id=7
Assumed Authentication Method=1 (Password)
Assumed BIN Key Id=1
Assumed Transaction Sequence Number=0000002F
Key A=0011223344556677 Key B=8899AABBCCDDEEFF
Therefore, the CVC2 algorithm calculation is based on Account Number=5432109876543210 Expiration Date=0047
Service Code=140
This produces a CVC2 three digit value=439 (see Table 6 for calculation):
Based on the calculated CVC2 value, the MAC field=0439000000
Therefore, the complete AAV in hex is:
8C 7CA7FBB6058B5114 01 11 0000002F 0439000000
Base-64-encoded, this is:
jHyn+7YFi1 EUAREAAAAvBDkAAAA=
The processing or calculation steps that are used in EXAMPLE 3 are shown in TABLE 6

TABLE 6

| Step | Processing Step | Example |
|---|---|---|
| 1. | Construct string of bits by concatenating (left to right) the right-most 4 bits of each character of the specified data elements. | 54321098765432100047140 |
| 2. | Place the results in a 128-bit field, padding on the right with binary zeros to fill all remaining bits. Split the 128-bit block into 2 64-bit blocks. | 54321098765432100047140000000000<br>Block 1 = 5432109876543210<br>Block 2 = 0047140000000000 |
| 3. | Encrypt Block 1 using Key A | Block 1 = 5432109876543210<br>Key A = 0011223344556677<br>Result = 44DD7C814CC62702 |
| 4. | XOR the results of Step 3 with Block 2. Encrypt this value using Key A. | Block 2 = 0047140000000000<br>Step 3<br>Result = 44DD7C814CC62702<br>Result = 449A68814CC62702 |
| 5. | Decrypt the result of step 4 using Key B. | Step 4<br>Result = 449A68814CC62702<br>Key B = 8899AABBCCDDEEFF<br>Result = 191DCA3149A5BD51 |
| 6. | Encrypt the result of step 5 using Key A. | Step 5<br>Result = 191DCA3149A5BD51<br>Key A = 0011223344556677<br>Result = 4F AB392CE3C98B41 |
| 7. | From the result of step 6, going from left to right, extract all numeric digits (0-9); left justify these digits in a 16-position field | 439239841 |
| 8. | From the result of step 6, going from left to right, extract all characters of A | 012421 |

TABLE 6-continued

| Step | Processing Step | Example |
|---|---|---|
| | through F. To compensate for decimals, subtract 10 from each extracted digit. | |
| 9. | Concatenate the digits from step 7 to the right of the digits extracted in step 8. | 439239841012421 |
| 10. | Select from the first three left-most digits of the CVC. | 439 |

As defined by the 3-D Secure protocol, all PARes messages returned to the merchant are digitally signed by the associated cardholder's issuer ACS. The merchant may be required to validate the digital signature prior to extracting the SPA AAV from the PARes message for inclusion in an authorization request sent to the acquirer. If an issuer supports both implementation of 3-D Secure and other authentication platforms (e.g., PC Authentication platforms) it may be necessary to distinguish between the two authentication platforms during processing of the authorization request message. This may be accomplished in one of two ways:

1. The first base 64 encoded character is
    a. "j" or "h" for the SPA AAV within the defined implementation of 3-D Secure
    b. "g" or "A" for the PC Authentication SPA AAV
2. The control byte, converted to binary, is either
    a. hexadecimal 8C or hexadecimal 86 for the AAV defined for MasterCard's implementation of 3-D Secure
    b. hexadecimal 82 or hexadecimal 02 for the PC Authentication SPA AA V.

Each issuer participating in program 1000 may assure that the ACS identifier sub field is appropriately set to indicate the algorithm used to create the MAC. Failure to set this indicator correctly may result in improper validations during the transaction/payment authorization process.

Although the present invention has been described in connection with specific exemplary embodiments, it should be understood that various changes, substitutions, and alterations apparent to those skilled in the art could be made to the disclosed embodiments without departing from the spirit and scope of the invention.

We claim:

1. A system for authenticating a cardholder transaction with a merchant on an electronic network, the system comprising:
    an issuer platform layer including at least one 3-D Secure authentication program;
    a merchant plug-in (MPI);
    an secure payment algorithm (SPA); and
    and a data transport layer, wherein the issuer platform comprises an access control server (ACS) that uses the SPA to process transaction and cardholder information for authentication by an authentication method and to generate an Accountholder Authentication Value (AAV) and conveys the AAV through the data transport layer to the MPI, wherein the AAV is a formatted data structure compatible with 3-D Secure message protocols, wherein the formatted data structure has a length of at most 20-bytes including bytes that identify a hash of the merchant's name, bytes that identify the ACS, bytes that identify the authentication method, bytes that identify secret cryptographic keys and bytes that include a merchant authentication code (MAC),
    wherein the SPA comprises an encryption algorithm for generating the MAC, wherein the encryption algorithm uses a pair of secret keys A and B that are identified in the AAV to encrypt a concatenation of the card holder's account number, card expiration date and service code to generate a three-digit CVC2 field, and uses the result to populate two bytes of the MAC.

2. The system of claim 1 wherein the AAV is a formatted data structure that is Base 64 encoded.

3. The system of claim 1, wherein the SPA comprises an encryption algorithm for generating the MAC, wherein the encryption algorithm uses a secret key identified in the AAV to encrypt a concatenation of the card holder's account number and a plurality of the fields of the bytes of the AAV excluding bytes that represent the MAC, and wherein a portion of the encryption result forms the MAC bytes in the AAV.

4. The system of claim 1 wherein the pair of secret keys A and B are 64-bit Data Encryption Standard (DES) keys.

5. The system of claim 1 wherein the ACS is configured to generate an AAV in response to a payment authentication request message from the MPI to the ACS.

6. The system of claim 1, which is configured to transport the AAV in a payment authentication response message from the ACS.

7. The system of claim 6 wherein the ACS is further configured to place a digital signature on the payment authentication response message.

8. The system of claim 1 wherein the MPI is configured to verify the digital signature on a received payment authentication response message.

9. The system of claim 1 wherein the MPI is configured to extract the MAC fields included in a payment authentication response message from the ACS and to place the extracted MAC in a payment authorization request message to a third party.

10. A data structure for conveying cardholder transaction authentication information amongst stakeholders in a 3-D Secure environment, the data structure comprising 20 bytes of Base 64 encoded characters, wherein the first byte is a control byte, bytes 2-9 represent a hash of a merchant name, byte 10 identifies an Access control server (ACS) that authenticates the cardholder transaction by an authentication method, byte 11 identifies the authentication method and the secret encryption keys that are used by the ACS to generate a Merchant Authentication Code (MAC), bytes 12-15 represent a transaction sequence number identifying a transaction number processed by the ACS, and bytes 16-20 represent the MAC,
    wherein the MAC comprises portions of an encryption of a concatenation of the card holder's account number, card expiration date and service code, and wherein a pair of keys A and B that are identified in byte 11 is used for encryption.

11. The data structure of claim 10 wherein the MAC comprises portions of an encryption of a concatenation of the card holder's account number and a plurality of the fields of bytes 1-15 of the data structure, and wherein a single key identified in byte 11 is used for encryption.

12. The data structure of claim 10 wherein a three-digit encryption result is used to populate two bytes of the MAC bytes 16-20.

13. The data structure of claim 10 wherein the pair of secret keys A and B are 64 bit Data Encryption Standard (DES) keys.

14. A method for authenticating a cardholder transaction with a merchant on an electronic network in an 3-D Secure environment, the method comprising:

using an Access control server (ACS) to process cardholder and transaction information to authenticate the cardholder by an authentication method;

deploying a secure payment algorithm (SPA) to generate an Accountholder Authentication Value (AAV) to represent the authentication results, and transporting the AAV in 3-D Secure messages to the merchant, wherein the AAV is a formatted data structure that has a length of at most 20 bytes, including bytes that identify a hash of the merchant's name, bytes that identify the ACS, bytes that identify the authentication method, bytes that include a merchant authentication code (MAC), and bytes that identify secret cryptographic keys that are used by the SPA to generate MAC, wherein deploying a SPA comprises:

using a pair of pair secret keys A and B that are identified in the AAV to encrypt a concatenation of the card holder's account number, card expiration date and service code to generate a three-digit CVC2 field; and assigning the result to populate two bytes of the MAC.

15. The method of claim 14 wherein the AAV is a formatted data structure that is Base 64 encoded.

16. The method of claim 14 wherein deploying a SPA comprises:

using a secret key identified in the AAV to encrypt a concatenation of the card holder's account number and at least portions of the bytes of the AAV excluding bytes that represent the MAC; and assigning a portion of the encryption result to the MAC bytes in the AAV.

17. The method of claim 15 wherein the pair of secret keys A and B are 64 bit Data Encryption Standard (DES) keys.

18. The method of claim 14 wherein transporting the AAV in 3-D Secure messages to the merchant comprises transporting the AAV in a payment authentication response message that is digitally signed by the ACS.

19. The method of claim 18, further comprising:

first, verification by the merchant of the digital signature on a received payment authentication response message; and next, extraction of the MAC fields from the received payment authentication response message by the merchant.

* * * * *